Oct. 9, 1956

A. JORDANOFF 2,765,994

UNIDIRECTIONAL AIRPORT

Filed April 29, 1953

INVENTOR
Assen Jordanoff

BY Cushman, Darby & Cushman
ATTORNEYS

Oct. 9, 1956 — A. JORDANOFF — 2,765,994
UNIDIRECTIONAL AIRPORT
Filed April 29, 1953 — 6 Sheets-Sheet 4

INVENTOR
Assen Jordanoff
BY Cushman, Darby & Cushman
ATTORNEYS

Oct. 9, 1956 A. JORDANOFF 2,765,994
UNIDIRECTIONAL AIRPORT
Filed April 29, 1953 6 Sheets-Sheet 5

INVENTOR
Assen Jordanoff
BY Cushman, Darby & Cushman
ATTORNEYS

Oct. 9, 1956     A. JORDANOFF     2,765,994
UNIDIRECTIONAL AIRPORT Filed April 29, 1953     6 Sheets-Sheet 6

INVENTOR
*Assen Jordanoff*

BY *Cushman, Darby & Cushman*
ATTORNEYS ary views of corresponding sections of the struc-

United States Patent Office 2,765,994
Patented Oct. 9, 1956

2,765,994

UNIDIRECTIONAL AIRPORT

Assen Jordanoff, Great Neck, N. Y., assignor to Strato-Port Corporation of America, Washington, D. C., a corporation of Delaware Application April 29, 1953, Serial No. 351,950

14 Claims. (Cl. 244—114)

This invention relates to airports, particularly to unidirectional airports, protected from cross-wind by novel wind dispersing structures.

As aircraft become progressively heavier, faster and more numerous, the problems of airport design have become exceedingly complex. Due to the necessity for longer and stronger runways, the capital expenditures involved in building and maintaining adequate airports of conventional type are enormous, and airport location has become a most difficult consideration. Increasing volume of traffic necessitates increasingly complex traffic and taxiing patterns and procedures, which in turn further aggravate the basic problems.

It is a primary object of the present invention to provide a unidirectional airport adapted to handle high density traffic irrespective of wind direction, force or change.

A further object of the invention is to provide a novel airport occupying substantially less area than conventional airports of comparable capacity, and requiring lower initial investment and maintenance cost.

Another object is to provide a unidirectional airport comprising two runways disposed end to end, the inner ends of the runways being elevated with respect to the outer ends for acceleration and deceleration assist.

Still another object is to provide a unidirectional airport inherently involving numerous features of safety. Particularly, the invention eliminates runway crossings, reduces taxiing, stacking, circling and demands on tower personnel and flight crews, and facilitates more orderly air traffic patterns and better marking and lighting. Also, the new airport is particularly adapted for a two-dimension instrument landing system.

Yet another object is to provide an airport adapted to reduce the cost of flight operations, through lower taxes, greater proximity to metropolitan centers, and reduction of taxiing, stacking, circling and resort to alternate airports.

A particular object is to provide novel wind dispersing structures, effective to protect runways from cross-wind and maintain low velocity, non-turbulent air flow thereacross.

Another object is to provide a unidirectional airport including novel wind dispersing structures, end portions of which are specially adapted to facilitate alignment and orientation of aircraft landing and taking off under severe cross-wind conditions.

Further objects of the invention will be in part obvious and in part pointed out hereinafter.

The invention and the novel features thereof may best be made clear from the following description and the accompanying drawings, in which.

Figure 1:
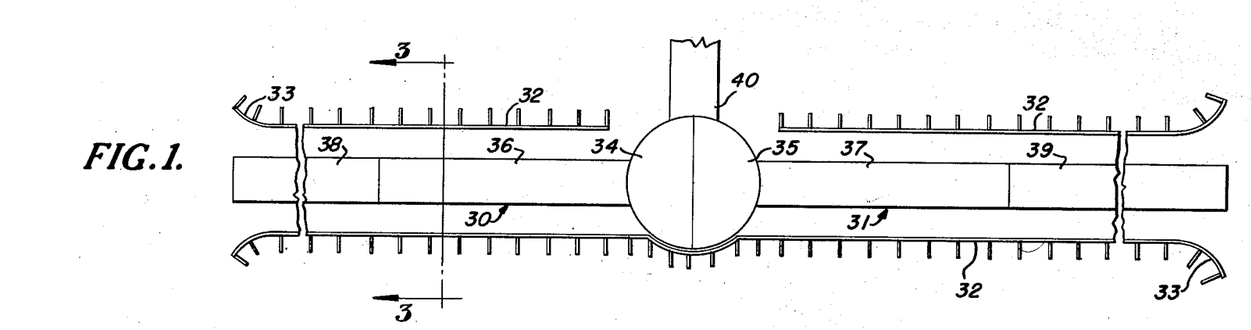
Figure 1 is a plan view, somewhat diagrammatic, of a unidirectional airport constructed according to the present invention, including two runways disposed end to end with wind dispersing structures on both sides of the runways.
Figure 2:
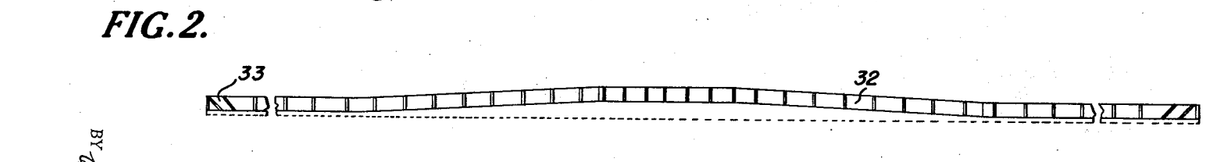
Figure 2 is a side elevational view of the airport of Figure 1.
Figure 3:
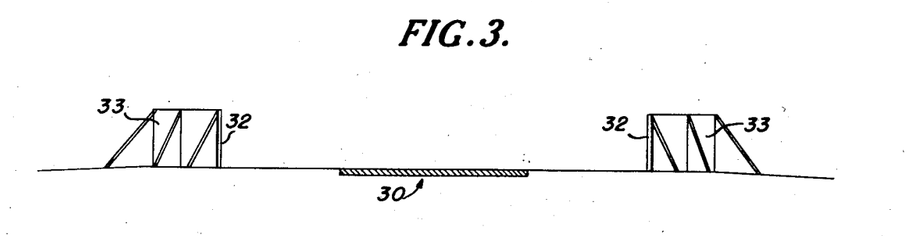
Figure 3 is a sectional view taken on the line 3—3 of Figure 1.

Referring to the drawings in detail, in Figures 1, 2, and 3 is shown an illustrative airport constructed according to the invention, comprising an aligned pair of runways 30 and 31 disposed in end-to-end abutting relationship. Adjacent each side of each runway, substantially parallel thereto and suitably spaced therefrom, is an elongated wind dispersing structure 32, to be particularly described hereinafter. The outer ends of the wind dispersing structures 32 may be outwardly curved, as at 33. In the illustrative example, runways 31 and 32 may be 150 feet wide, and the wind dispersing structures spaced outwardly from the edges thereof 100 feet, the resultant spacing between opposite structures 32 being 350 feet. The height of wind dispersing structures 32 must be effective to prevent direct access of cross-wind to aircraft on the runways, 50 feet being adequate in most cases.

As shown in Figures 1 and 2, the runway inner ends 34 and 35 are elevated relative to the outer ends thereof.

Adjoining inner end sections 34 and 35 are outwardly and downwardly sloping sections 36 and 37, which may be for example 1000 feet long and have a grade of approximately 2%. Sloping sections 36 and 37 merge into level outer sections 38 and 39, which are extended to provide a total length for each runway of 5000 feet or more. The runway inner end sections 34 and 35 are preferably widened as shown to provide maneuvering space, and extending laterally therefrom is an entry and exit taxiway 40, the wind dispersing structure 32 on that side being discontinuous to accommodate the taxiway.

When the prevailing wind is in the direction of the runways, aircraft may take off and land into the wind in the customary manner, utilizing the downwind runway for landing and the upwind runway for take-off. When the prevailing wind is at an angle to the runways, as will appear, the wind dispersing structures effect low velocity, nonturbulent air flow across the runways regardless of prevailing wind direction and velocity. When the wind has a directional component from the left as shown in Figure 1, aircraft will land from right to left, on the outer end section 39 of runway 31. As will be apparent, the sloping section 37 will serve to decelerate the landed aircraft, minimizing necessary braking effort, and the aircraft will come to the end of its landing roll on the inner end section 35. Thereafter, the aircraft may turn off onto taxiway 40, which may lead directly to an adjacent terminal. Departing aircraft may use taxiway 40 for access to the inner end section 34 of runway 30, and take off in the same direction. In take-off, the sloping section 36 will serve to give the aircraft an initial acceleration boost, reducing power plant effort and permitting the aircraft to become airborne in a shorter distance and to leave the airport with greater altitude. When the wind has a directional component from the right as shown in Figure 1, take-offs and landings will be made in the opposite direction, aircraft landing on runway 30 and taking off on runway 31. In the event of a cross-wind approximately 90° to the runways, traffic may move in either direction.

Figure 4:
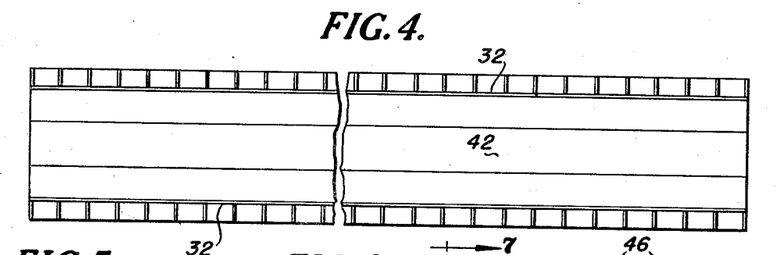
Figure 4 is a plan view of another unidirectional airport, comprising a single flat runway with wind dispersing structures on both sides thereof.

In Figure 4 is illustrated a simplified airport constructed according to the invention, comprising a single level runway 42 which may be approximately 6000 feet in length. A wind dispersing structure 32 extends along each side of runway 42, suitably spaced therefrom as in the previous case. In this embodiment, when the prevailing wind has a directional component from left to right as shown, aircraft will land on the right-hand end of the runway, and taxi off the left-hand end thereof. Departing aircraft will taxi to the right-hand end of the runway and take off to the left. When the prevailing wind has a directional component from right to left, the opposite procedure will be followed. The runway 42 may be a river or canal, that is, an elongated body of water.

Figures 5, 6, 7, 8, 9:
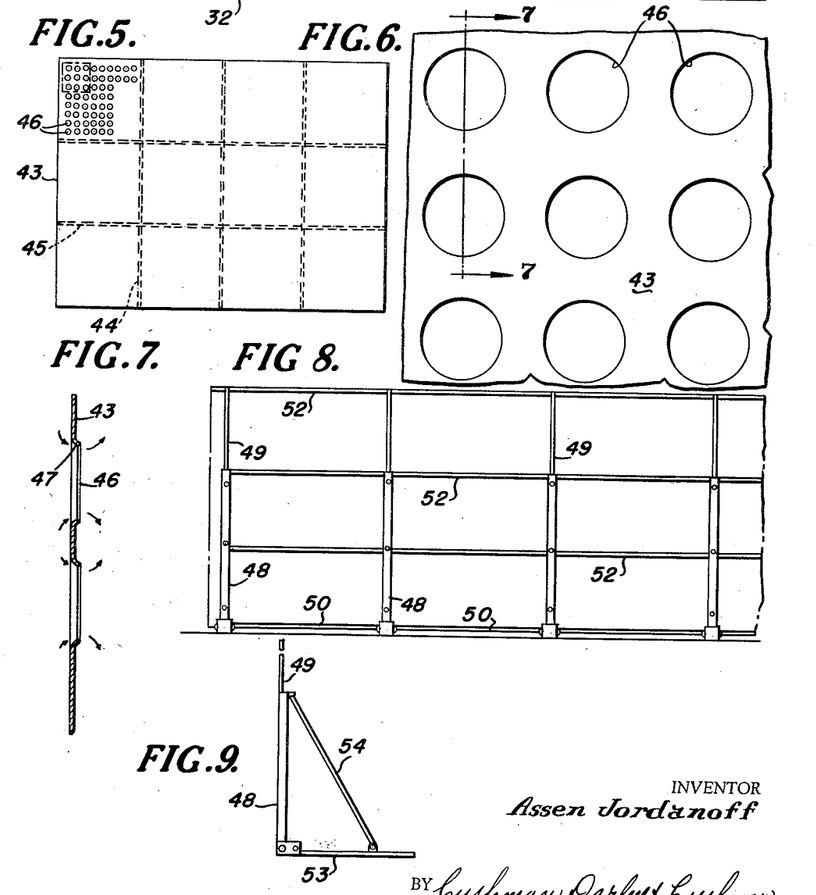
Figure 5 is an elevational view of a section of a preferred wind dispersing structure.
Figure 6 is a greatly enlarged fragmentary view of a portion of Figure 5.
Figure 7 is a sectional view taken on the line 7—7 of Figure 6.
Figure 8 is a side elevational view of another form of wind dispersing structure, showing details of illustrative supporting and bracing elements therefor.
Figure 9 is an end elevational view of the structure of Figure 8.

As used throughout the instant specification and claims, the term "wind dispersing structure" connotes an air-permeable structure adapted to greatly reduce the velocity of wind passing therethrough without imparting turbulence thereto. A preferred form of wind dispersing structure is illustrated in Figures 5 and 6, and comprises a frame 43, which may be sheet aluminum or steel, supported and stiffened by vertical supports 44 and horizontal stiffeners 45. The frame 43 is provided with a multiplicity of relatively small openings 46 having sharply defined edges.

As best shown in Figure 6, the openings may be round and four units in diameter, with centers spaced apart a distance corresponding to six units, resulting in a collective open area in the frame of slightly less than 35% of the total area thereof. The openings 46 may be drilled, cut, punched or otherwise formed, the only essential requirement being that the edges of the openings be relatively sharp. That is, for attainment of the desired effect it has been found that the air passing through the openings must be caused to expand abruptly upon emergence therefrom. While the openings are preferably in the plane of the frame, they may be slightly removed therefrom as indicated in Figure 7. In that figure, the openings are defined on one side by smoothly rounded lips 47. This configuration will serve effectively in the desired manner if the rounded lips 47 are presented to the wind, that is, are on the windward side, whereby wind passing through the openings will emerge on the opposite side, whereat the openings are relatively sharply defined, and expand abruptly.

The shape of openings 46 is not critical, and they may be square, rectangular, triangular, or of other form. It is essential, however, that they be relatively small in proportion to the total area of the frame, a significant dimension of 12 inches or less being found to be satisfactory in a frame 50 feet high and of considerably greater length, although somewhat larger openings may be employed. Cross-wind encountering the wind dispersing structure so described emerges therefrom with greatly reduced velocity. The air passes through the openings at approximately prevailing velocity, usually somewhat higher, so that on the lee side of the frame there results a great multiplicity of relatively small jets of high velocity flow, separated by intervening relatively dead spaces. The high velocity jets, due to the sharply defined edge openings, expand abruptly upon emerging, causing local turbulence and mixing which within a short distance resolves into a smooth, non-turbulent flow of greatly lowered velocity as compared to that of the wind impinging on the structure. In passage through the frame, a large proportion of the initial kinetic energy of the wind is dissipated and converted into heat.

If the porosity of the frame, that is, the ratio of open area to total area, is too great, the velocity of the wind will not be reduced sufficiently for the purpose of runway protection. Conversely, if the porosity of the frame is too low, the flow beyond it will be mildly or extremely turbulent. It has been found that for the purpose of reducing velocity effectively, that is more than about 50%, without inducing turbulence, the porosity of the frame must be within the limits of from about 20% to about 35%. A frame of the preferred type illustrated in Figures 5 and 6 will reduce the velocity of air passing therethrough approximately 85%, whereby a 50 mile per hour cross-wind impinging directly thereon will be reduced to a non-turbulent flow having a velocity of about 8 miles per hour.

An illustrative supporting and bracing structure for frame 43 is illustrated in Figures 8 and 9, wherein are shown a plurality of suitably spaced vertical posts 48 which extend approximately ⅔ the height of the frame and support thereabove extension posts 49 of smaller diameter. The posts are joined adjacent their bottom ends by horizontal members 50, and thereabove by vertically spaced horizontal stiffeners 52. The frame 43 may be secured continuously or at intervals to the elements 48, 49, 50 and 52 in any suitable manner, for example by means of bolts, brackets or welding. From the lower end of each post an outrigger 53 may extend laterally, and a brace 54 may extend angularly from each outrigger to the top of the associated post.

Figure 10:
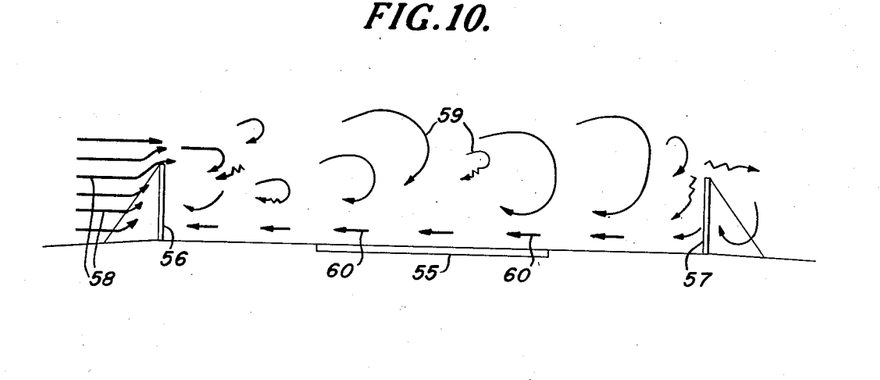
Figure 10 is a diagram illustrating cross-wind effect on a runway disposed between solid vertical walls.
Figure 11:
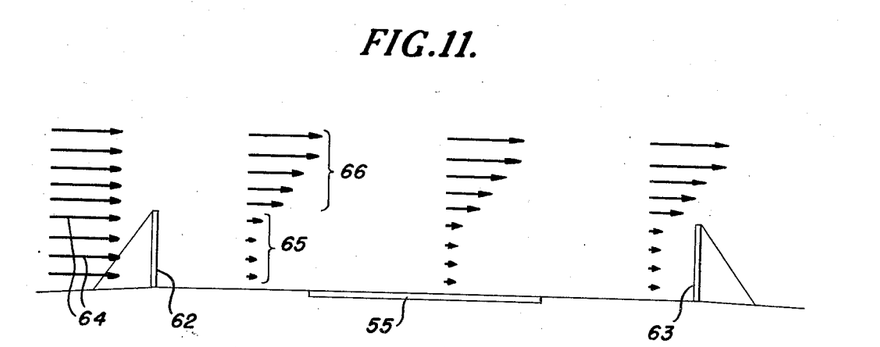
Figure 11 is a similar diagram illustrating cross-wind effect on a runway protected by wind dispersing structures according to the present invention.

The effect of the wind dispersing structure described as compared to that of solid, non-permeable structures is illustrated in Figures 10 and 11. Referring to Figure 10, 55 illustrates a section of a runway, and 56 and 57 indicate solid vertical walls spaced from the runway edges. Assuming a steady cross-wind from the left, indicated by arrows 58, the wind will encounter the outer side of wall 56 and be diverted upwardly thereby. A stream of high velocity air will pass over the top of the wall, occasioning extreme turbulence in the area over runway 55, as indicated by arrows 59. The air flow immediately above the surface of the runway will be in direction opposite to that of the prevailing wind, as indicated by arrows 60, and at relatively low velocity, but at slightly higher levels the air flow will be turbulent and in diverse directions. The presence of a downwind wall 57 serves only to accentuate and compound the turbulence effected by the upwind wall 56.

In contrast, and referring to Figure 11, if the runway be adjoined by wind dispersing structures 62 and 63, a cross-wind will pass therethrough at greatly reduced velocity and without turbulence. In a prevailing cross-wind of, for example, 50 miles per hour, indicated by arrows 64, the wind will permeate structure 62 and emerge therefrom at a velocity of approximately 8 miles per hour, indicated by the short arrows 65. The local minor turbulences immediately adjacent the downwind side of the structure 62 extend for only a few feet, and the air flow thereafter is entirely smooth. The velocity distribution from the runway to a level approximating the top of the structure 62 is quite constant, the wind velocity immediately adjacent the surface of the runway being very little or no different from the wind velocity 45 or 50 feet above the runway, in the case of a 50 foot high structure. The single structure 62 satisfactorily effects this result, which persists for a considerable distance beyond the structure. The effect may extend without diminution for a distance corresponding to 5 or 10 times the height of the structure. Thereafter, the air velocity well above the ground will increase progressively, and at greater distance the prevailing wind conditions will again obtain.

The presence of a second wind dispersing structure 63 spaced from the structure 62 has the effect of slightly lowering the air velocity therebetween, and considerably extending the area of smooth, low-velocity flow effected by the upwind structure 62. When two wind dispersing structures are employed, it has been found that they may be spaced apart a distance as great as 15 times the height thereof, while effectively maintaining low velocity, non-turbulent flow throughout the space therebetween. A practical lower limit for the spacing between wind dispersing structures is five times the height thereof. The use of two spaced wind dispersing structures has the additional advantage of protecting aircraft from the full effect of sudden changes in cross-wind.

The spacing between the wind dispersing structures will normally be dictated, within the limits prescribed, solely on safety considerations. The structures will impart to pilots a better directional and aircraft attitude sense than derived from an open runway. The structures should be spaced adequately from the runway to permit aircraft considerable latitude without danger of collision. While the structures must possess sufficient strength to withstand the pressure of high velocity cross-winds and gusts, they will normally be constructed to attain the requisite strength with a minimum of mass, being particularly designed to give way upon contact with the inner sides thereof, so that in the event an aircraft deviates from the runway and encounters the structure, damage to the aircraft will be minimized, and the possibility of injury to crew and passengers will be virtually eliminated.

Rather surprisingly, the air flow across the runway at a level above the tops of the structures 62 and 63 is also beneficially affected, being smooth and of reduced velocity up to a height approximating twice that of the structures. In the case of 50 foot structures and a 50 mile per hour 90° cross-wind for example, the air velocity 60 feet above the runway at all points between the structures will be within the range of from 15 to 20 miles per hour. The air velocity 75 feet above the runway is found to be within the range of from 20 to 30 miles per hour, and the air velocity will not equal the prevailing wind velocity at levels less than 100 feet above the runway. The air flow at levels above the dispersing structure height also is quite smooth. This vertically extended effect of the wind dispersing structures is indicated by the arrows 66. The wind dispersing structure height must obviously be effective to prevent direct access of cross-wind to aircraft on or immediately above the runway, and, as will be evident from the foregoing, 50 feet will suffice for the largest present-day aircraft.

The provision of wind dispersing structures as described permits the construction and full utilization of a unidirectional airport, that is, an airport having a runway or runways extending in one direction only. As will be evident, such unidirectional airport may be utilized at all times, regardless of velocity or direction of prevailing wind. The effect of gusts on aircraft landing and taking off is substantially eliminated, and changes of wind direction occasion no or only very slight operational delays. "Cross-wind" landings and take-offs may be made by conventional aircraft, with conventional landing gear.

The unidirectional airport lends itself to greatly simplified and more orderly air traffic patterns, and straight-in approaches may be made in all cases. Under instrument conditions, every straight-in instrument approach may terminate in landing, without circling for runway alignment. An absolute minimum of taxiing is required and such taxiing need never interfere with flight operations. These advantages permit the unidirectional airport to safely and quickly handle a large volume of traffic, which in turn reduces or eliminates stacking under instrument conditions. Also, the resort to alternate airports because of unfavorable weather conditions is greatly reduced. If necessary for extremely heavy traffic, parallel runways may be utilized, each in effect constituting a complete airport.

The unidirectional airport obviously requires less land area than conventional airports of comparable capacity, and less runway and taxiway construction, thereby greatly reducing initial cost. The cost of constructing wind dispersing structures is minor compared to the savings effected by the elimination of additional runway construction. Maintenance costs are similarly reduced, and operational expenses such as may be involved in clearing runways of snow or ice are comparably reduced. With the unidirectional airport, approach strips beyond the ends of the runway may be acquired and cleared. Clear approach strips not only afford greater safety, but also reduce noise and nuisance to adjoining areas. In this regard it may be noted that the wind dispersing structures described are effective to materially reduce noise radiation from the runway. These advantages will permit airport location closer to metropolitan centers, thereby further improving and reducing the cost of air operations. Additionally, adequate airports can be made available to smaller communities. As will be evident, the airport illustrated in Figures 1 and 2 is adapted for construction on uneven terrain, and is self-draining, especially the sloping sections thereof where normally most of the aircraft braking must occur.

The unidirectional airport inherently involves safety factors other than those indicated above. Runway crossings are eliminated entirely, and taxiing reduced to a bare minimum, so that ground accidents should become relatively non-existent. An instrument landing system may be permanently aligned with the runway, which will always be the runway in use, and a two-dimension instrument landing system may be employed. The unidirectional airport makes possible better runway lighting and marking, and fog dispersal becomes practical. The control tower may be located close to the runway, and demands on its personnel will be relatively small. The tower personnel may more readily keep track of aircraft on the ground, as well as of those in the air. From the military point of view, greater deployment of bases is possible, without prohibitive cost.

Figure 12:
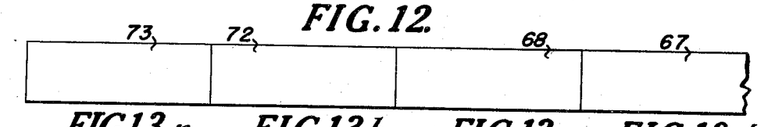
Figure 12 is an elevational view of an end portion of an exemplary wind dispersing structure, comprising sections of progressively greater open area.
Figure 13A:
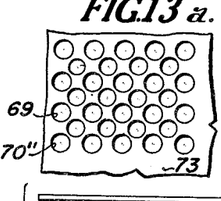
Figures 13a, 13b, 13c and 13d are greatly enlarged fragmentary views of corresponding sections of the structure of Figure 12.
Figures 13B, 13C:
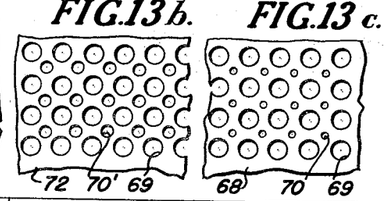
Figure 13D:
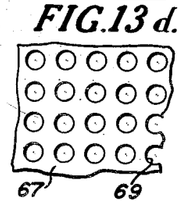
Figure 14:
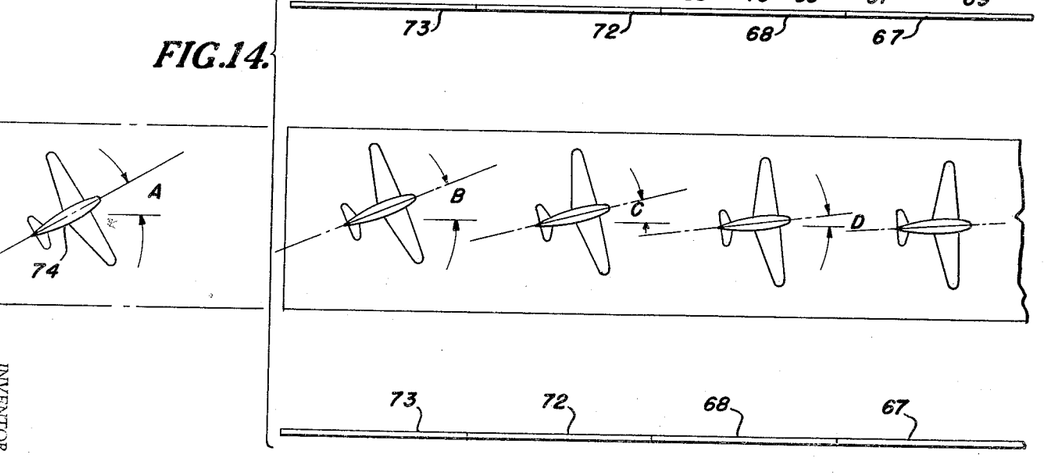
Figure 14 is a plan view of an end portion of an airport provided with wind dispersing structures of the type illustrated in Figure 12, showing the gradual alignment of an aircraft landing thereon.

A further aspect of the invention is illustrated in Figures 12 to 14, wherein end portions of the wind dispersing structures include sections of progressively greater porosity, to facilitate aircraft orientation when landing or taking off under severe cross-wind conditions. Referring to Figure 12, 67 indicates the central and main extended portion of a wind dispersing structure, constructed as previously described and having a porosity somewhat less than 35%, as indicated in Figure 13d. Outwardly of the main portion 67 is a section 68, incorporating more open area. As shown in Figure 13c, the frame of the wind dispersing section 68 may comprise openings 69 corresponding to those of Figure 13d, and additional smaller openings 70 to effect an overall porosity of perhaps 40%.

The next outer section 72 may comprise a frame having an even greater porosity, effected for the purpose of example by a frame having openings 69 corresponding to those of Figure 13d, and interspersed smaller openings 70', corresponding to but greater in diameter than the openings 70 of Figure 13c, to effect an overall open area of perhaps 50%. The outermost section 73 may be similarly constructed, but utilize interspersed holes 70" corresponding in diameter substantially to that of the openings 69, whereby an overall open area and porosity between 65% and 70% is effected. Each of the sections 68, 70 and 72 may be, for example, 100 feet in length.

The structure sections 68, 72, and 73 will not function effectively to reduce wind velocity in the manner of central portion 67, but will reduce the velocity of air passing therethrough to a limited extent. The overall result of this modification is to provide at the end of a unidirectional airport an entry section within the confines of which wind velocity is progressively reduced from the prevailing wind condition to the velocity existing between the main wind dispersing structures, as exemplified by central portions 67.

This is illustrated in Figure 14, wherein at the left an aircraft 74 is shown in position approaching a landing. Assuming a landing speed of 100 miles per hour and a 90° cross-wind from the left of the aircraft of 50 miles per hour, the aircraft must approach the runway in a crabbed position, at an angle A of 30°. Under such severe conditions, should the aircraft enter between wind dispersing structures according to the invention adapted to reduce cross-wind 85%, the aircraft would enter into an abrupt change of condition which would require sudden action by the pilot to align and orient the aircraft. In the embodiment illustrated in Figures 12 to 14, the aircraft first enters an area wherein the cross-wind is only slightly reduced, perhaps 25% or less, and then proceeds to a further area where the cross-wind is reduced to a somewhat greater extent, perhaps 45%. The aircraft then enters between sections 68, whereat the cross-wind may be reduced by, for example, 65%, and then proceeds into the area wherein full reduction of cross-wind is effected. This transitional stage of progressively reduced cross-wind affords the pilot an extended opportunity to properly and smoothly orient the aircraft with the runway, as indicated by the progressively smaller angles B, C and D, and permits smoother, relatively effortless landings. This outer end construction of the wind dispersing structures is of similar benefit to aircraft taking off under severe cross-wind conditions.

Figures 15, 16, 17, 18:
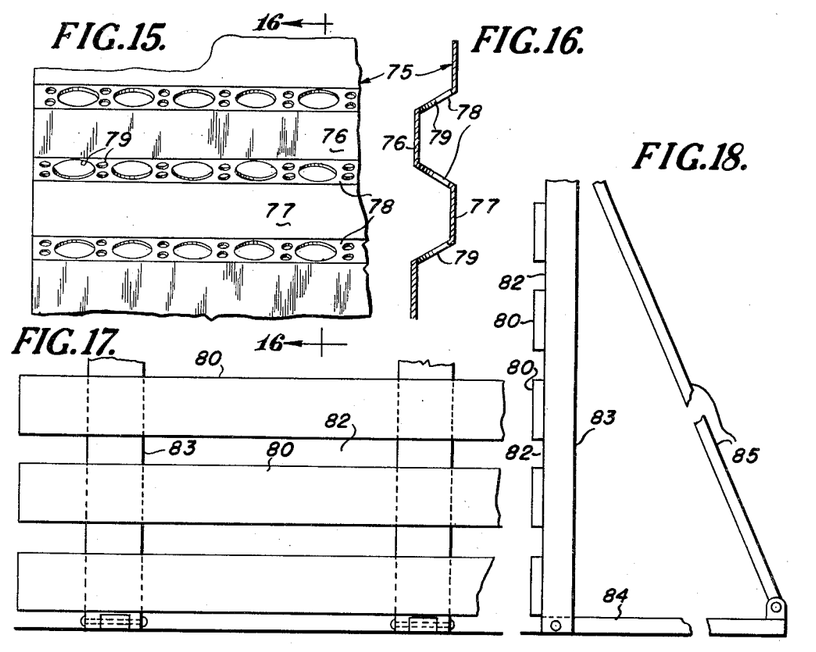
Figure 15 is a side elevational view of another form of wind dispersing structure.
Figure 16 is a sectional view taken on the line 16—16 of Figure 15.
Figure 17 is a side elevational view of still another form of wind dispersing structure.
Figure 18 is an end elevational view of the structure of Figure 17.

In Figures 15 and 16 is illustrated an alternative form of wind dispersing structure, comprising a horizontally corrugated frame 75, the corrugations including flat tops 76 and bottoms 77 disposed in vertical planes, and inclined sides 78. In this embodiment, openings 79 supply the requisite porosity, and are confined to the corrugation sides 78. While a corrugated frame is necessarily heavier than a flat frame of comparable frontal area, its inherent stiffness may permit the elimination or reduction in size of some supporting and stiffening structure. The corrugations need not be horizontally extended, but may extend vertically or obliquely.

Another form of wind dispersing structure is shown in Figures 17 and 18, constituting horizontally extended slats 80, spaced apart and separated by intervening openings 82. The slats 80 may be mounted on vertical posts 83, which in turn are braced and supported by outriggers 84 and inclined braces 85. The slats 80, by way of example, may be 8 inches in width, and separated by intervening openings 4 inches wide, or less.

Figure 19:
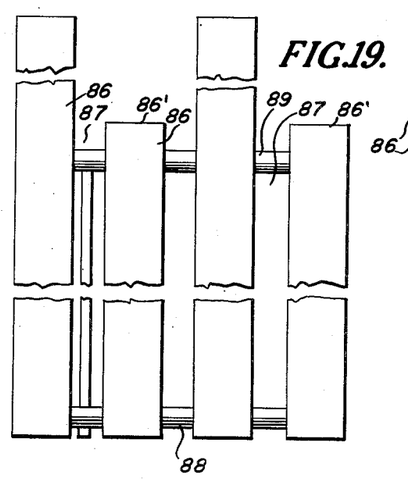
Figure 19 is a side elevational view of yet another form of wind dispersing structure, illustrating a modification wherein the upper portion of the frame comprises more open area than does the lower portion thereof.
Figure 20:
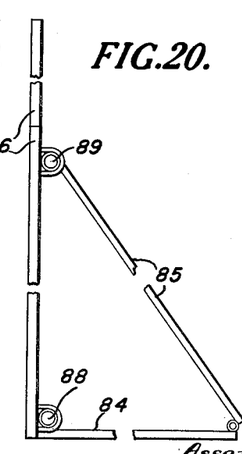
Figure 20 is an end elevational view of the structure of Figure 19.

Still another form of wind dispersing structure is indicated by Figures 19 and 20, wherein the frame comprises a plurality of vertical slats 86, separated by elongated openings 87. The slats may be suitably mounted on vertically spaced horizontal members 88 and 89, braced as in the previous embodiment by outriggers 84 and inclined braces 85.

The embodiment illustrated in Figures 19 and 20 involves a further feature of the invention, in that the uppermost portion of the frame is more porous than is the major lower portion thereof. This may be achieved simply, in this embodiment, by shortening the tops of alternate or periodically selected slats 86, as at 86'. This expedient has proved effective to reduce the tendency of some wind dispersing structures to form an eddy at the top thereof, with resulting turbulence. In such cases, increasing the open area in the uppermost portion of the frame will obviate such tendency. In some cases this expedient will permit the use of highly efficient designs in the lower and major portion of the structure, which designs might be disadvantageous if extended to the top due to such eddying tendency. Many forms of the invention, such as the structure of Figures 5 and 6, exhibit no tendency whatever to form eddies at the top thereof, and may employ a frame uniform from top to bottom with excellent results.

Figures 21, 22:
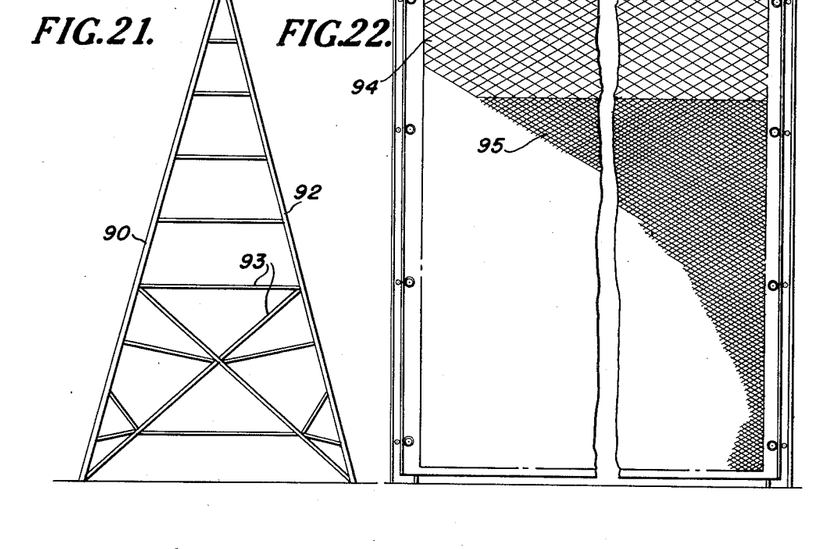
Figure 21 is an end elevational view of a modified form of wind dispersing structure, comprising a double frame.
Figure 22 is a side elevational view of the structure of Figure 21.

Figures 21 and 22 illustrate yet another form of the invention, wherein two frames 90 and 92 are utilized, supported in relatively closely spaced relationship on opposite sides of an inverted V framework 93. The frames 90 and 92 may be constructed according to any of the species previously disclosed, but for purposes of further illustration may comprise conventional meshes of expanded metal. As seen in Figure 22, the upper portion 94 of frame 92 may comprise a mesh of relatively greater porosity than the lower portion 95 thereof. That is, the upper portion 94 may have a porosity equal to or slightly greater than 35%, and the major lower portion 95 a porosity substantially less. While each of the individual frames 90 and 92 is constructed as previously described, and would serve alone as an effective wind dispersing structure, the use of a double frame is found in some cases to effect a somewhat greater overall velocity reduction and a measurably smoother flow. The use of a double frame in a wind dispersing structure may also permit the effective use of frames having slightly greater porosity than would be effective in a single frame.

Figure 23:
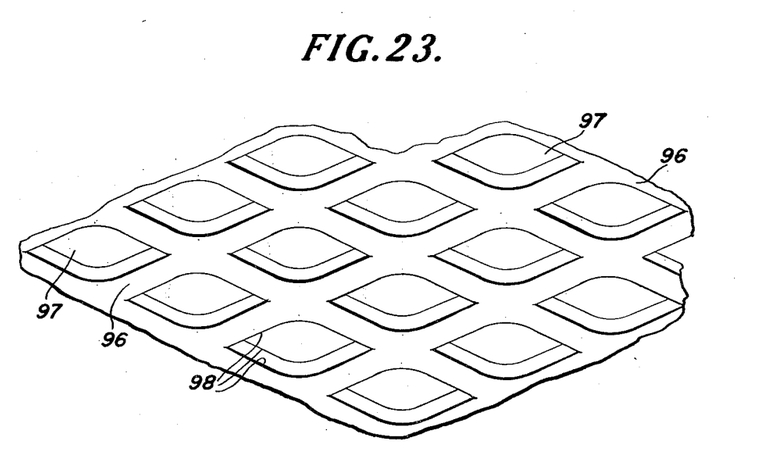
Figure 23 is a greatly enlarged fragmentary view of an expanded metal mesh useful in a wind dispersing structure.

Figure 23 illustrates a conventional expanded metal mesh which may be utilized in the embodiment of Figures 21 and 22. As shown, such expanded metal comprises a continuous metal web 96 interspersed with regularly spaced openings 97. Due to the well known method of manufacture of such mesh, the openings 97 are defined by relatively sharp edges 98.

The frames of the embodiment of Figure 21, it will be noted, are slightly inclined relative to the ground, rather than vertical. In all cases the effect is the same, and any of the forms disclosed may be disposed vertically or inclined at a large angle relative to the ground with equally good results. The outriggers, braces or other supporting structure for the frames may be disposed on the inside or outside thereof, relative to the runway, as may be preferred.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore

I claim:

1. A unidirectional airport adapted for safe use by aircraft during high cross-wind conditions comprising, a runway and a fence-like wind dispersing structure disposed closely adjacent to and parallel to one side of said runway, said structure including a foraminous plate-like member and supports therefor, said member being substantially co-extensive in length with said runway and extending from the ground to a height at least as great as that of aircraft using the runway, said member having a multiplicity of relatively small openings having a significant dimension of 12 inches or less, said openings having sharply defined edges and comprising together from about 20% to about 35% of the total area of said member.

2. An airport according to claim 1, wherein said openings are round.

3. An airport according to claim 1, wherein said openings are elongated and vertically extended.

4. An airport according to claim 1, wherein said openings are elongated and horizontally extended.

5. An airport according to claim 1, wherein said plate-like member comprises an expanded metal mesh.

6. An airport according to claim 1, wherein said plate-like member is corrugated and includes vertical portions and inclined portions, and said openings are confined to said inclined portions.

7. An airport according to claim 1, wherein said plate-like member is inclined slightly from the vertical.

8. A unidirectional airport adapted for safe use by aircraft during high cross-wind conditions comprising, a runway and a fence-like wind dispersing structure disposed closely adjacent to and parallel to each side of said runway, each of said structures including a foraminous plate-like member and supports therefor, said members being substantially co-extensive in length with said runway and extending from the ground to a height at least as great as that of aircraft using the runway, said members having a multiplicity of relatively small openings having a significant dimension of 12 inches or less, said openings having sharply defined edges and comprising together from about 20% to about 35% of the total area of said members.

9. An airport according to claim 8, wherein said structures are spaced apart from each other a distance within the range of from 5 to 15 times the height of said structures.

10. An airport according to claim 8, wherein the plate-like members of said structures are inclined slightly from the vertical.

11. A unidirectional airport adapted for safe use by aircraft during high cross-wind conditions comprising, a runway and a fence-like wind dispersing structure disposed closely adjacent to and parallel to one side of said runway, said structure including a foraminous plate-like member and supports therefor, said member being substantially co-extensive in length with said runway and extending from the ground to a height at least as great as that of aircraft using the runway, said member having a multiplicity of relatively small openings having a significant dimension of 12 inches or less, said openings having sharply defined edges, said openings in the major lower portion of said member comprising together from about 20% to about 35% of the total area of said portion, and said openings in the uppermost portion of said member comprising together a larger percentage of open area than in said lower portion.

12. A unidirectional airport adapted for safe use by aircraft during high cross-wind conditions comprising, a runway and a fence-like wind dispersing structure disposed closely adjacent to and parallel to one side of said runway, said structure including a foraminous plate-like member and supports therefor, said member being substantially co-extensive in length with said runway and extending from the ground to a height at least as great as that of aircraft using the runway, said member having a multiplicity of relatively small openings having a significant dimension of 12 inches or less, said openings having sharply defined edges, said openings in the major central portion of said member comprising together from about 20% to about 35% of the total area of said portion, and said openings in the end portions of said members comprising together a larger percentage of open area than in said central portion.

13. A unidirectional airport adapted for safe use by aircraft during high cross-wind conditions comprising, a runway and a fence-like wind dispersing structure disposed closely adjacent to and parallel to one side of said runway, said structure including a foraminous plate-like member and supports therefor, said member being substantially co-extensive in length with said runway and extending from the ground to a height at least as great as that of aircraft using the runway, said member having a multiplicity of relatively small openings having a significant dimension of 12 inches or less, said openings having sharply defined edges, said openings in the major central portion of said member comprising together from about 20% to about 35% of the total area of said portion, and said openings in successive sections of the end portions of said members comprising together progressively larger percentages of open area than in said central portion, the open area of said end portion sections increasing from said central portion outwardly.

14. An airport adapted for safe use by aircraft during high cross-wind conditions comprising, a landing and take-off area and a fence-like wind dispersing structure disposed closely adjacent to and parallel to one edge of said area, said structure including a foraminous plate-like member and supports therefor, said member being substantially co-extensive in length with said area and extending from the ground to a height at least as great as that of aircraft using the area, said member having a multiplicity of relatively small openings having a significant dimension of 12 inches or less, said openings having sharply defined edges and comprising together from about 20% to about 35% of the total area of said member.

References Cited in the file of this patent

UNITED STATES PATENTS

| Number | Name | Date |
|---|---|---|
| 1,006,796 | Rupp | Oct. 24, 1911 |
| 1,168,959 | Pancoast | Jan. 18, 1916 |
| 1,242,940 | Hopper | Oct. 16, 1917 |
| 1,468,553 | Bese | Sept. 18, 1923 |
| 1,545,909 | McKinnon | July 14, 1925 |
| 1,582,574 | Carlson | Apr. 27, 1926 |
| 1,746,101 | Carver | Feb. 4, 1930 |
| 1,874,423 | Belleville | Aug. 30, 1932 |
| 2,082,406 | Lloyd | June 1, 1937 |
| 2,095,520 | Fugit | Oct. 12, 1937 |
| 2,172,944 | Norris | Sept. 12, 1939 |
| 2,329,102 | Chipley | Sept. 7, 1943 |
| 2,400,841 | Rogers | May 21, 1946 |
| 2,465,587 | Hartley | Mar. 29, 1949 |
| 2,522,144 | Stump | Sept. 12, 1950 |
| 2,522,667 | DeLand | Sept. 19, 1950 |

FOREIGN PATENTS

| Number | Country | Date |
|---|---|---|
| 924,016 | France | Mar. 3, 1947 |